United States Patent
Kmonk et al.

[11] 4,268,356
[45] May 19, 1981

[54] NUCLEAR REACTOR FUEL ASSEMBLY GRID

[75] Inventors: Stanley Kmonk, Plum Borough, Pa.; John L. Alder, Pocatello, Id.; Francis R. Racki, O'Hara Township, Allegheny County, Pa.

[73] Assignee: Westinghouse Electric Corp., Pittsburgh, Pa.

[21] Appl. No.: 924,542

[22] Filed: Jul. 14, 1978

[51] Int. Cl.³ .................................................. G21C 3/34
[52] U.S. Cl. ............................................ 176/78; 176/76
[58] Field of Search ........................................ 176/76, 78

[56] References Cited

U.S. PATENT DOCUMENTS

| | | | |
|---|---|---|---|
| 3,481,832 | 12/1969 | Rickert | 176/78 |
| 3,791,466 | 2/1974 | Patterson | 176/76 |
| 3,920,516 | 11/1975 | Kmonk | 176/78 |
| 4,135,972 | 1/1979 | Anthony | 176/78 |
| 4,137,125 | 1/1979 | Walters | 176/78 |

*Primary Examiner*—Donald P. Walsh

*Attorney, Agent, or Firm*—J. R. Campbell; Z. L. Dermer

[57] ABSTRACT

A grid for a nuclear reactor fuel assembly which includes intersecting straps arranged to form a structure of egg crate configuration. The cells defined by the intersecting straps are adapted to contain axially extending fuel rods, each of which occupy one cell, while each control rod guide tube or thimble occupies the space of four cells. To effect attachment of each guide thimble to the grid, a short intermediate sleeve is brazed to the strap walls and the guide thimble is then inserted therein and mechanically secured to the sleeve walls. Each sleeve preferably, although not necessarily, is equipped with circumferentially spaced openings useful in adjusting dimples and springs in adjacent cells. To accurately orient each sleeve in position in the grid, the ends of straps extending in one direction project through transversely extending straps and terminate in the wall of the guide sleeve. Other straps positioned at right angles thereto terminate in that portion of the wall of a strap which lies next to a wall of the sleeve.

5 Claims, 4 Drawing Figures

NUCLEAR REACTOR FUEL ASSEMBLY GRID

BACKGROUND OF THE INVENTION

The invention described herein relates to grids for nuclear reactor fuel assemblies and more particularly to an improved grid structure which helps assure precise attachment and alignment of control rod guide thimble sleeves in grid straps while still making springs and dimples accessible excessable for adjustment.

Conventional designs of grids for nuclear reactor fuel assemblies include a multiplicity of interleaved straps of egg crate configuration designed to form cells which accept fuel rods and control rod guide thimbles. A peripheral strap having the same width as the interleaved straps encloses the interleaved straps to impart strength and rigidity to the fuel assembly. In order to minimize the lateral displacement of fuel rods and to improve the flow characteristics of an assembly, a number of grids are spaced along the fuel assembly length. These grids are held in place by brazing or otherwise affixing control rod guide thimble sleeves to the grid, and guide thimbles are then axially inserted therethrough and subsequently secured to the sleeves. Each sleeve is short and projects only a few inches beyond the grid upper and lower surfaces. Control rod guide thimbles extend through the axially aligned sleeves in each of the grids along the fuel assembly length, and are secured thereto by bulging the guide thimble walls outwardly at a point immediately above and below the guide thimble sleeves. The control rods then axially reciprocate in the sleeves during reactor operation. When assembled, the fuel assembly includes great strength and rigidity and the fuel rods are effectively held against lateral displacement because of the cooperative effect provided by the grids.

Different methods are utilized for attaching the guide thimble sleeves to the straps in the grids. In one well known design, the sleeve is brazed directly to the exposed surface of the interleaved straps which comprise the grid. In still another design, the sleeve is provided with openings such that the sleeve is permitted to straddle the straps but nevertheless effectively anchor it in position. The disadvantages inherent in these designs are that the sleeves may not be precisely aligned so that the axes of a number of sleeves in vertically aligned grids are not the same, and as a result, the center line of control rod guide thimbles which are secured in the sleeves may not fall on the sleeve axes. As a result binding of control rods which are adapted to move vertically in the guide thimbles during reactor operation, may occur in the guide thimbles during operation. Also, there is no convenient way to adjust the springs and dimples within grid cells immediately adjacent to the cell which contains the control rod guide thimble. Further, known designs do not provide accurate methods for locating sleeves in the grid to achieve true alignment with sleeves in other grids.

SUMMARY OF THE INVENTION

Briefly stated. the above disadvantages are overcome in this invention by providing a grid of the type which utilizes, in addition to single cells for fuel rods, four grid cells for receiving each control rod guide thimble sleeve in a fuel assembly. The ends of the strap which is cut or interrupted to permit the insertion of the sleeve in the area occupied by four cells, are made of a length sufficient to extend through a transversely disposed strap plus the thickness of the wall of the sleeve. A strap extending in a direction at right angles to the aforementioned strap likewise is interrupted or cut along its length to provide the remaining space for a cell into which the sleeve fits. The two thus exposed ends of this interrupted strap are made of a length sufficient to extend only through the wall of transversely extending straps which are in contact with the sides of the sleeve. This design therefore serves to accurately orient and position each sleeve in the grid body in order to help assure that the corresponding sleeves in adjacent grids will be in exact alignment with each other. Openings also are provided in each sleeve to permit accessibility of springs and dimples for adjustment purposes.

BRIEF DESCRIPTION OF THE DRAWINGS

While the specification concludes with claims particularly pointing out and distinctly claiming the subject matter of the invention, it is believed the invention will be better understood from the following description taken in connection with the accompanying drawings wherein:

DESCRIPTION OF THE PREFERRED EMBODIMENT

Figure 1:
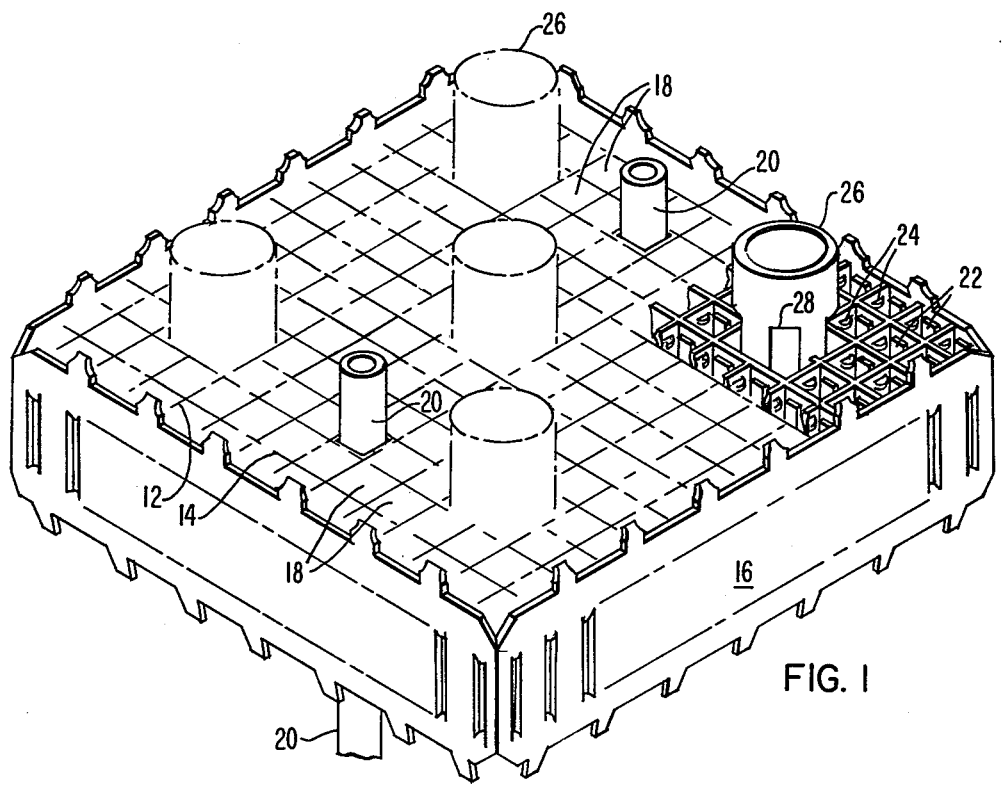
FIG. 1 is an isometric view of a grid illustrating the position and arrangement of fuel rods and control rod guide thimble sleeves therein.

Referring now to the drawings wherein like reference characters designate like or corresponding parts throughout the several views, there is shown in FIG. 1 a perspective view of a single fuel assembly grid 10 which includes interleaved straps 12, 14 enclosed in a peripheral strap 16 to form the grid of egg crate configuration. The interleaved straps thus form multiple cells 18 through which fuel rods 20 are adapted to extend. Each fuel rod is held in place in a well known manner by springs 22 on two adjacent straps forming part of a cell and a pair of axially spaced dimples 24 on the other two adjacent straps which complete the enclosure of a cell to thereby provide a six point support to each fuel rod. Obviously, other different and well known types of fuel rod support arrangements may be used.

Figure 4:
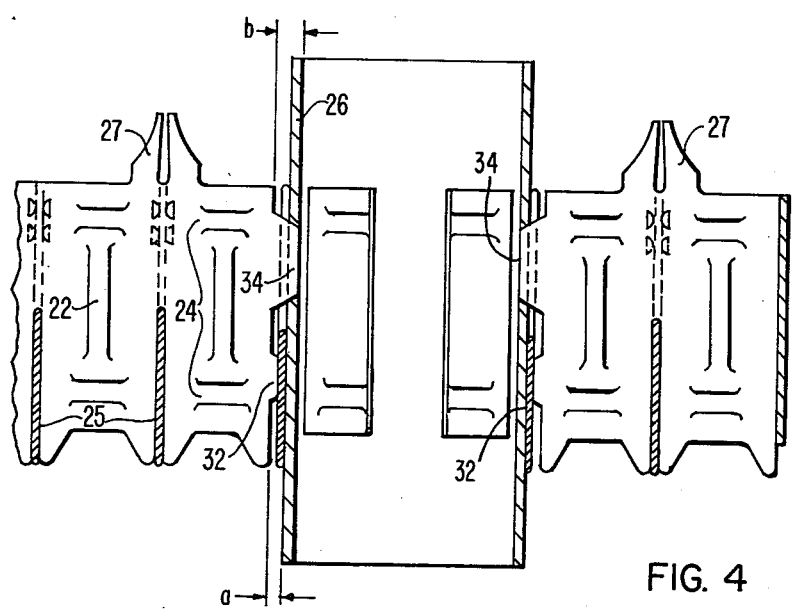
FIG. 4, is a front elevation view of a strap illustrating the design of tabs on the opposite ends thereof for securing a sleeve in position in the grid.

FIG. 4 illustrates in more detail the design of strap used for holding fuel rods in position. The springs 22 are created by deforming material in the middle of the strap including dimples 24 above and below the springs. Slots 25 are utilized to effect an interlocking engagement with adjacent straps while sections of the material 27 are punched outwardly to establish vanes for directing flow of coolant through the assembly. Vanes optionally are used for directing coolant flow in the system.

In accordance with this invention, each sleeve 26 is of cylindrical configuration and occupies the space of four grid cells and is designed to accept a control rod guide thimble conventionally used for housing control rods which reciprocate therein during reactor operation. Each sleeve extends a short distance above and below the grid, as shown, and is attached to the grid strap walls by brazing. Although the structure is shown, it will be understood that each sleeve receives a control rod guide thimble which axially extends through the corresponding sleeves on each grid spaced along the fuel assembly length. This arrangement serves many functions including providing strength and rigidity to the fuel assembly. Control rods which control the reactor reactivity then reciprocate in the control rod guide thimbles during reactor operation.

Figure 2:
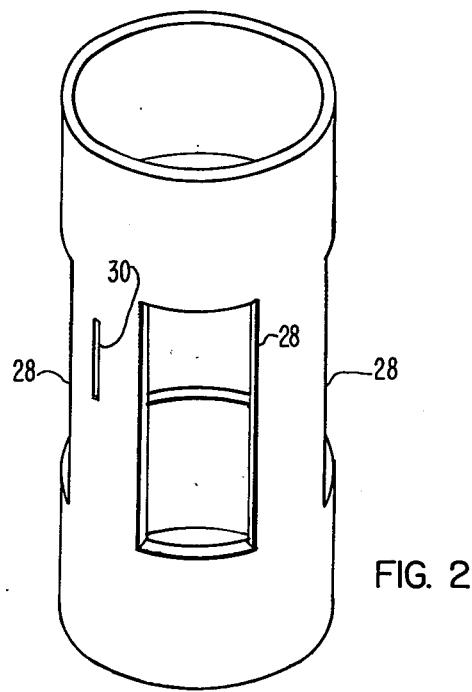
FIG. 2 is a perspective view of a sleeve of the type which may be affixed in the grid of FIG. 1.

FIG. 2 illustrates the design of sleeve shown in FIG. 1. It may be made of Inconel, zircoloy, stainless steel or other material and as indicated previously, extends a short distance above and below the grid. Four windows 28 are formed in the sleeve walls at 90° intervals and when the sleeve is brazed in place, each window will face the corner of the cell area in which it is placed. The purpose for this individual orientation is to provide access to the springs dimples in the adjacent cells for adjustment purposes. Such windows are not a necessity and the sleeve all could remain solid throughout the sleeve length. However, if windows are not provided, the limited space between the outside wall of the sleeve and the adjacent strap walls having the springs or dimples makes it inconvenient to manipulate adjustable tools designed to be placed therein for spring and dimple adjustment purposes. A combination of solid sleeves and window-type sleeves in the same grid may be used, if desired.

Figure 3:
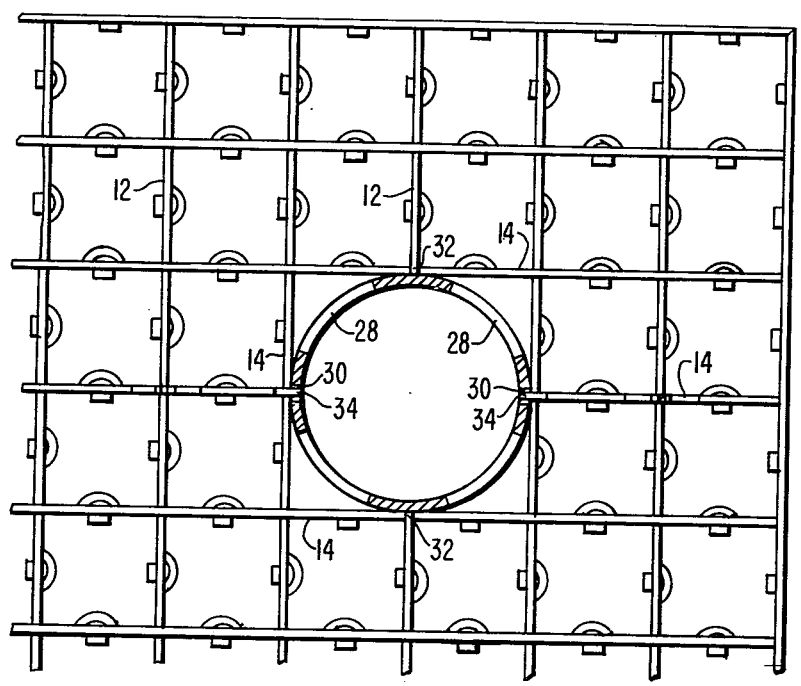
FIG. 3 is an enlarged plan view of a portion of a grid showing how the straps of the grid are fixed to a control rod guide thimble sleeve.

During the course of assembling a grid, the sleeves must be accurately oriented and fixed in position not only on a line running through the sleeve axes to help assure accurate verticality of the sleeves, but also in a position where the sleeve windows will face corners of the grid. In the design shown, this is accomplished by milling a pair of oppositely disposed slots 30 in the sleeve which are of a size sufficient to receive a portion 34 of the ends of a strap 14, which has been interrupted to form a space in which the sleeve fits. As illustrated in FIG. 3, each interrupted end of a strap 12 includes a tab 32 which terminates in and is brazed to transverse extending strap 14 on opposite sides of the sleeve. The other interrupted strap 14 likewise is equipped with tabs 34 which are longer than tabs 32 and these tabs project through the transversely extending strap 12 and into the slots 30 milled in the walls of sleeve 26. By providing tabs in this manner, it will be apparent that after the tabs are placed in position and welded or brazed to the transverse strap and sleeve, the grid will take on a substantial degree of rigidity, the windows of each sleeve will be oriented in the correct direction, and the sleeve will be vertically aligned accurately with the strap walls and therefore the grid.

FIG. 4 more clearly shows the size and disposition of tabs on the straps 14. Tabs 32 project outwardly on opposite ends of the strap a distance "a" and this distance is just sufficient to extend through the thickness of a strap as shown in the plan view of FIG. 3. Tabs 34 however extend a distance "b" and that distance is sufficient to extend through the strap 12 thickness plus the thickness of sleeve walls, as also shown on FIG. 3.

It will be apparent that many modifications and variations are possible in light of the above teachings. It therefore is to be understood that within the scope of the appended claims, the invention may be practiced other than as specifically described.

We claim:

1. A grid for a nuclear reactor fuel assembly comprising:
    a multiplicity of interleaved straps which form a grid of egg-crate configuration having multiple cells therein;
    at least two intersecting and transversely extending straps in said grid being interrupted along their length to provide a space equal to four cells;
    at least one control rod guide thimble sleeve of a size sufficient to fit in said space;
    means accurately positioning said sleeve in said space in the grid and orienting it in a direction such that the axis of said sleeve lies in a plane parallel to said straps;
    said means including tabs on the facing ends of at least one of said straps which has been interrupted along its length to provide the space for said sleeve, said tabs being located on opposite sides of said sleeve and extending through the wall of transversely extending straps and into opposite sides of said sleeve;
    means securing said facing strap ends to said sleeves to thereby provide the desired orientation and direction of said sleeve in the grid.

2. The grid according to claim 1 wherein said means securing said facing strap ends to said sleeve include a slot on opposite sides of said sleeve, said tabs being of a size and configuration to fit snugly into said slots, and means bonding said tabs to the walls of said sleeve defining said slots.

3. The grid according to claim 2 wherein walls of the said sleeve are brazed to walls of the straps which extend along the length of their points of contact.

4. The grid according to claim 2 wherein each of said sleeves have windows located around the sleeve at 90° intervals, each of said windows being oriented in a direction toward the corners of said cell to thereby provide access to springs and dimples on adjacent straps.

5. The grid according to claim 2 wherein the ends of interrupted straps at right angles to the first interrupted strap are located on opposite sides of said sleeves and extend through the walls of the strap lying transversely thereto, and means brazing said ends along their length to the outer walls of said sleeve.

* * * * *